Feb. 2, 1954  P. WHITESIDE  2,667,902
TREE SAW ATTACHMENT FOR AGRICULTURAL TRACTORS
Filed July 3, 1952  2 Sheets-Sheet 1
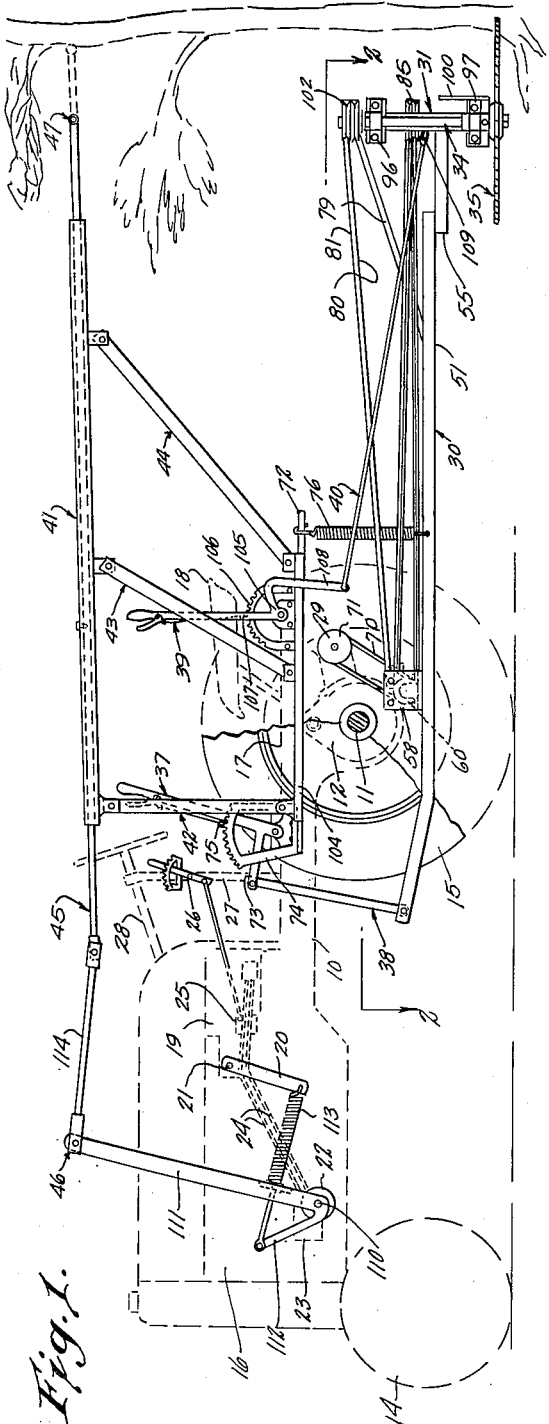
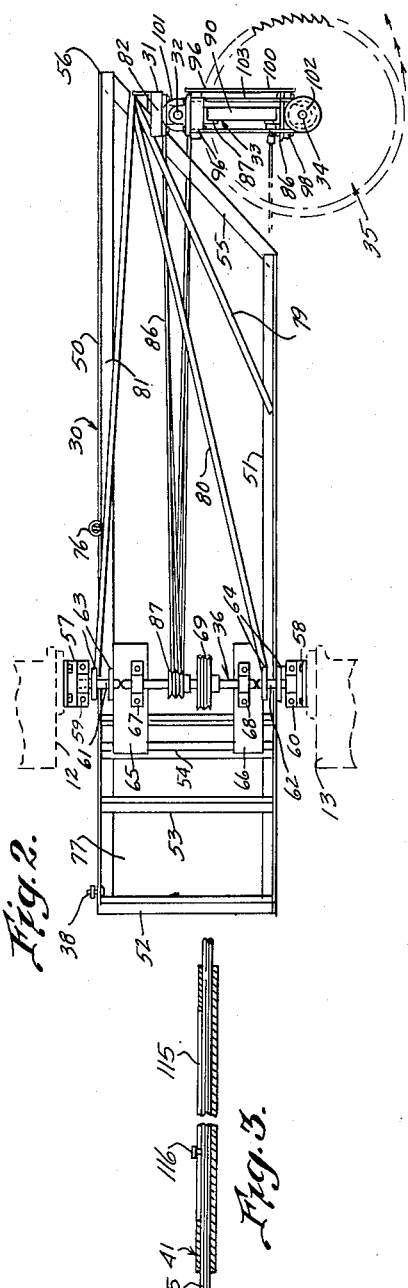
INVENTOR
Philip Whiteside,
BY
McMorrow, Berman + Davidson
ATTORNEYS Feb. 2, 1954 P. WHITESIDE 2,667,902
TREE SAW ATTACHMENT FOR AGRICULTURAL TRACTORS
Filed July 3, 1952 2 Sheets-Sheet 2

INVENTOR
Philip Whiteside,

BY
McMorrow, Berman + Davidson
ATTORNEYS.

Patented Feb. 2, 1954

2,667,902

UNITED STATES PATENT OFFICE 2,667,902

TREE SAW ATTACHMENT FOR AGRICULTURAL TRACTORS

Philip Whiteside, Tyler, Tex.

Application July 3, 1952, Serial No. 297,040

6 Claims. (Cl. 143—43)

This invention relates to tree saw attachments adapted to be mounted on and driven by agricultural tractors and more particularly to a tree felling attachment which includes a power operated saw and a power operated pusher for causing trees cut off by the saw to fall in a desired direction.

It is among the objects of the invention to provide an improved tree saw attachment for an agricultural tractor which can be easily mounted on an existing tractor with no material modification of the tractor construction to extend rearwardly from the associated tractor; which has a generally horizontally disposed saw mounted at the rear end of the attachment and driven from the power take-off connection of the associated tractor; which has tree pushing mechanism disposed above the saw and operated by the hydraulic implement lift mechanism of the associated tractor; which is effective to complete a tree felling operation while the associated tractor remains stationary; which can be elevated at its rear end for convenience in movement of the tractor and attachment from place to place; which has its operating levers positioned in front of an operator seated on the tractor for greater convenience in the use of the device; and which is simple and durable in construction, economical to manufacture from readily available materials, and positive and effective in operation.

Other objects and advantages will become apparent from a consideration of the following description and the appended claims in conjunction with the accompanying drawings wherein:

Figure 1 is a side elevational view of a tree felling attachment illustrative of the invention and an associated agricultural tractor, the tractor being shown in broken lines and having one rear wheel removed to clarify the illustration;

Figure 2 is a top plan view of the attachment;

Figure 3 is a fragmentary cross sectional view of a tree pusher mounted on the tractor and co-operating with the tree felling attachment;

Figure 4:
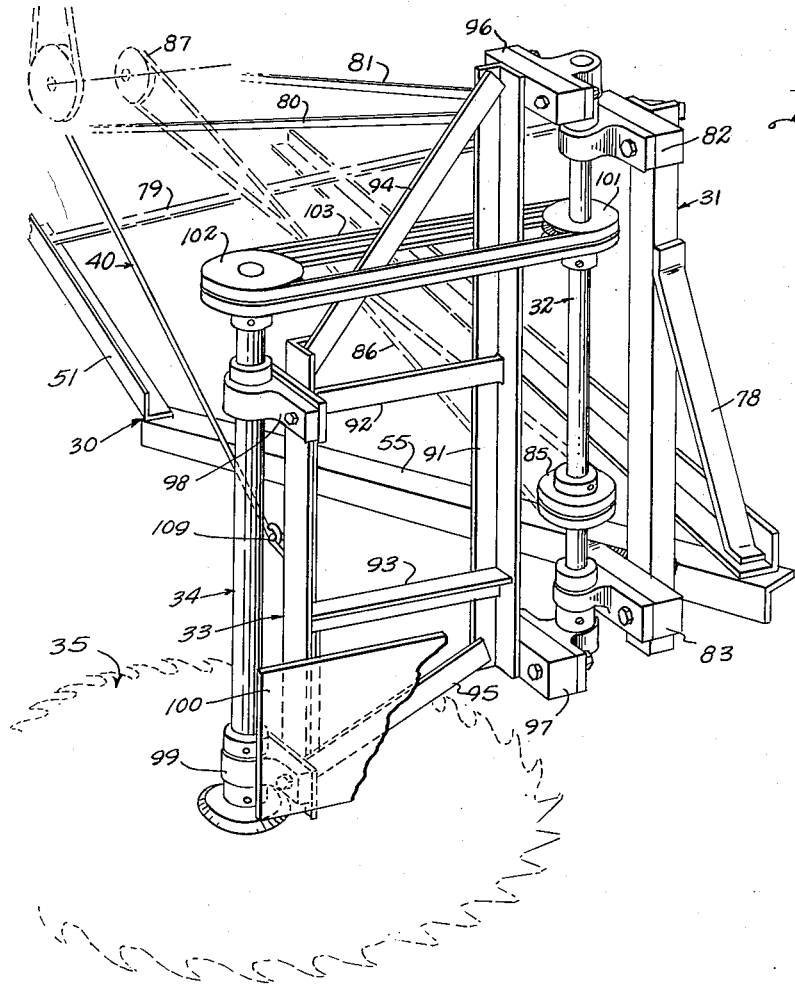
Figure 4 is a perspective view of a fragmentary rear end portion of the attachment.
Figure 5:
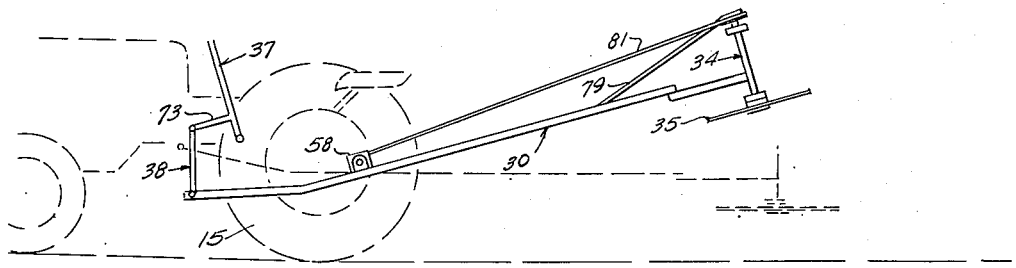
Figure 5 is a somewhat diagrammatic side elevational view of the tractor and attachment showing the attachment in raised position.

With continued reference to the drawings, the tractor comprises a frame 10 supported at its rear end on the housing of the rear axle 11 which includes gear housings 12 and 13 disposed one at each side of the tractor, and supported at its front end on front steering wheels 14. The rear axle housing is supported on a pair of coaxial rear driving wheels one of which is illustrated and designated at 15 and an engine 16 is mounted on the front portion of the frame 10 and drivingly connected to the rear driving wheels of the tractor by means well known to the art. A flat, substantially horizontal platform 17 is disposed above the housing of the rear axle 11 and a driver's seat 18 is mounted on this platform. A hydraulic implement lift mechanism 19 is mounted on the frame 10 at the rear end of the engine 16 and includes an implement lift arm 20 depending from and angularly movable about a shaft 21 which projects from the implement lift mechanism 19 and is substantially horizontally disposed transversely of the tractor frame 10. A bearing structure 22 for pivotally mounting an implement carrying arm is mounted on the tractor frame near the front end of the engine and the implement lift 19 is powered by a pump 23 driven by the engine 16 and connected to the implement lift through conduits 24 and a control valve 25 operated by a manually movable lever 26 mounted on a brace 27 for the steering column 28 of the tractor and disposed within convenient reach of an operator seated on the tractor seat 18.

A power take-off connection 29 is mounted on the housing of the rear axle 11 substantially midway between the rear driving wheels and is disposed adjacent the rear end of the tractor platform 17.

As agricultural tractors of the character illustrated are old and well known to the art, a more detailed illustration and description of the tractor is considered unnecessary for the purposes of the present disclosure, a suitable tractor for carrying the tree sawing attachment of the present invention being the "Club" tractor manufactured by International Harvester Company of Indianapolis, Indiana.

The tree felling attachment comprises, in general, a main frame 30 pivotally mounted intermediate its length on the housing of the rear axle 11 for swinging movement about a substantially horizontal axis disposed transversely of the main frame and substantially parallel to the rotational axis of the rear driving wheels of the tractor, and extending forwardly and rearwardly relative to the tractor from its pivotal connection with the rear axle housing of the tractor, a substantially vertically disposed post 31 mounted at its lower end on the main frame 30 at the rear end of the latter, a shaft 32 disposed parallel to and journaled on the post 31, a sub-frame 33 journaled at one side on the post 31 by the shaft 32, a shaft 34 journaled on the sub-frame 33 at the other side of the latter, and disposed substantially parallel to the shaft 32, a circular saw 35 mounted on the shaft 34 at the lower end thereof and means including a shaft 36 mounted on the main frame 30 for rotation about an axis substantially coincident with the axis of the pivotal connection between the main frame and the tractor rear axle housing 11, drivingly connecting the tractor power take-off connection 29 to the saw-carrying shaft 34. The attachment also includes a hand lever 37 mounted on the tractor platform 17 and connected by a link 38 with the main frame 30 at the front end of the latter for raising and lowering the rear end of the main frame and the saw 35, and a hand lever 39 also mounted on the tractor platform and connected by a link 40 to the sub-frame 33 for swinging the sub-frame about the axis of its pivotal connection with the post 31 to feed the saw 35 into a tree disposed adjacent the rear end of the main frame 30 of the attachment. This constitutes generally the tree sawing portion of the attachment and the tree pusher attachment comprises an elongated tubular guide 41 mounted on the tractor by standards 42, 43 and 44 and extending longitudinally of the main frame 30 above and substantially parallel to the latter, a pusher rod 45 extending slidably through the tubular guide 41, link and lever mechanism 46 connecting the implement lift arm 20 to the pusher rod 45 at the front end of the latter, and a cross bar 47 secured intermediate its length to the pusher rod 45 at the rear end of the latter and disposed substantially perpendicular to the pusher rod and at right angles to the rotational axis of the saw 35 for engaging a tree above the saw and pushing the tree in a direction away from the tractor as the tree is cut off near the ground by the saw.

The main frame 30 comprises a pair of spaced apart and substantially parallel side members 50 and 51 connected by front and intermediate cross members 52, 53 and 54 disposed substantially perpendicular to the side members, and by a rear cross member 55 disposed at an angle to the side members, the side member 50 being longer than the side member 51 so that the frame terminates at its rear end substantially in a point 56 at the rear end of the right hand side member 50. Angle brackets 57 and 58 are secured to the gear housings 12 and 13 respectively at the inner sides of the gear housings and extend toward each other in the space between the spaced apart gear housings. Bearings 59 and 60 are mounted on the brackets 57 and 58 respectively and stub shafts 61 and 62 are secured to the side members 50 and 51 by pairs of spaced apart, apertured lugs 63 and 64 and are received at their outer ends in the bearings 59 and 60 to pivotally mount the main frame of the attachment on the gear housing portions 12 and 13 of the housing of the rear axle 11 of the tractor. Bracket plates 65 and 66 are mounted on the main frame adjacent the inner sides of the side members 50 and 51 respectively and below the corresponding stub shafts 61 and 62. Bearings 67 and 68 are mounted on the plates 65 and 66 respectively and the shaft 36 is journaled near its respectively opposite ends in the bearings 67 and 68. A belt pulley 69 is mounted on the shaft 36 and connected by a belt 70 to a belt pulley 71 on the tractor power take-off connection 29 for driving the shaft 36 from the power take-off connection of the tractor.

The hand lever 37 is pivotally mounted on a bar 72 which is mounted on the tractor platform 17 along the right hand edge of the platform adjacent the main frame side member 50, and an arm 73 projects forwardly from the hand lever near the lower end of the latter and substantially perpendicular thereto. A toothed quadrant 74 is mounted on the bar 72 concentrically of the pivotal connection between the hand lever 37 and the bar and the hand lever carries a manually movable detent engageable with the teeth of the quadrant in a manner well known to the art to releasably lock the hand lever at selected positions of adjustment along the quadrant.

By moving the upper end of the hand lever 37 forwardly the operator is able to lift the rear end of the main frame 30 and the saw 35 and by moving the upper end of this hand lever rearwardly he is able to lower the rear end of the main frame and the saw, and by use of the quadrant 74 and detent 75 he is able to releasably lock the mechanism in position with the saw 35 at any desired level within its range of vertical movement.

The bar 72 extends rearwardly of the platform 17 of the tractor and a tension spring 76 is connected between the rear end of this bar and the frame side member 50 rearwardly of the pivotal connection between the frame and the tractor rear axle housing so that the spring counterbalances the major portion of the weight of the rear portion of the frame, the saw and the saw-driving mechanism mounted on the frame and reduces the manual effort necessary to be applied to the hand lever 37 to raise and lower the saw. Also, if desired, the front portion of the main frame between the cross members 52 and 53 may be provided with a bottom or platform 77 and suitable counter-weights may be placed on this platform to assist the counter-balancing spring 76 in overcoming the weight of the rear portion of the attachment.

The post 31, which may be a length of structural angle iron as illustrated in Figure 4, is secured at its lower end to the rear cross member 55 of the main frame adjacent the rear end of the side member 50 and is supported in its upright position relative to the main frame by a diagonal brace 78 extending from the rear end of the side member 50 to the post at a location above the main frame and diagonal braces 79, 80 and 81 extending forwardly from the post near the upper end of the latter to the side member 51 at locations spaced apart along this side member and to the side member 50 at a location adjacent the pivotal connection between the main frame and the rear axle housing of the tractor. Bearing blocks 82 and 83 are secured to the post 31 at the upper and lower ends respectively of the post and have a common axis substantially parallel to the longitudinal center line of the post. The shaft 32 is journaled near its upper and lower ends in the bearing blocks 82 and 83 and a belt pulley 85 is mounted on this shaft and connected by a belt 86 with a belt pulley 87 on the shaft 36 for drivingly connecting the tractor power take-off connection to the shaft 32 through the idler or lay shaft 36.

The sub-frame 33 has spaced apart and substantially parallel side members 90 and 91 connected by intermediate cross members 92 and 93 disposed substantially perpendicular to the side members and upper and lower cross members 94 and 95 respectively, disposed at an angle to the side members so that the sub-frame terminates at its upper end substantially in a point at the upper end of the side member 91 and at its lower end substantially in a point at the lower end of the side member 90. The side member 91 of the sub-frame is disposed adjacent the shaft 32 and bearing blocks 96 and 97 are secured to the side member 91 at the upper and lower ends respectively thereof and receive the upper and lower ends of the shaft 32 to pivotally mount the substantially vertically disposed sub-frame 33 on the substantially horizontally disposed main frame 30 for swinging movement about a substantially vertical axis coincident with the rotational axis of the shaft 32.

Bearing blocks 98 and 99 are mounted on the side member 90 of the sub-frame 33 at the upper and lower ends respectively of this side member and the shaft 34 is journaled near its upper and lower ends in the bearing blocks 98 and 99 for rotation about an axis spaced from and substantially parallel to the rotational axis of the shaft 32. The sub-frame is thus off-set laterally from the rear end of the side member 50 of the main frame and the saw 35 is mounted on the lower end of the shaft 34 and disposed somewhat below the main frame 30 of the attachment. A guard plate 100 of rectangular shape is mounted on the sub-frame 33 at the lower end thereof and at the side of the sub-frame remote from the rear cross member 55 of the main frame to guard the sub-frame and the shaft 34 from engagement by a tree with which the horizontally disposed saw 35 is engaged.

A belt pulley 101 is mounted on the shaft 32 above the pulley 85 and a belt pulley 102 is mounted on the upper end of the shaft 34 and drivenly connected by a belt 103 with the pulley 101 thus completing the drive from the tractor power take-off connection to the saw 35 through the saw arbor shaft 34.

The hand lever 39 is mounted on a bar 104 which is mounted on the tractor platform 17 and extends along the left-hand edge of the platform adjacent the side member 51 of the main frame of the attachment. This lever is pivotally connected at its lower end to the bar 104 by pivotal connection 105 and a toothed quadrant 106 is mounted on the bar 104 concentrically of the pivotal connection 105 and is engaged by a detent 107 carried by the hand lever 39 to releasably lock the hand lever in selected positions of adjustment relative to the quadrant. An arm 108 extends outwardly and downwardly from the lower end of the hand lever 39 and is connected at its lower end to the front end of the link 40, the rear end of this link being connected to the side member 90 of the sub-frame 33 by a pivotal connection 109.

When the upper end of the hand lever 39 is moved forwardly of the tractor the saw arbor 34 is moved rearwardly of the tractor and will be fed into a tree disposed adjacent the rear end of the frame 30, as illustrated in Figure 1. The saw 35 and saw arbor 34 are moved forwardly of the tractor by moving the upper end of the hand lever 39 rearwardly.

The standards 42, 43 and 44 are rigidly connected at their lower ends to the bar 104 or to some convenient structural part of the associated tractor and are rigidly connected at their upper ends to the guide tube 41 at locations spaced apart along the under side of the guide tube.

The link and lever mechanism 46 connecting the tractor hydraulic implement lift to the front end of the push rod 45 comprises an arbor 110 journaled in the bearing 22 on the tractor and projecting outwardly therefrom, a lever 111 mounted at its lower end on the arbor 110 and projecting upwardly from the arbor to a location adjacent the front end of the rod 45, an arm 112 extending upwardly and forwardly from the lower end of the lever 111 and connected at its distal end to the lower end of the implement lift arm 20 by a link 113, and a link 114 pivotally connecting the upper end of the lever 111 to the forward end of the push rod 45.

By moving the manual control lever 26 for the implement lift mechanism the operator can control the hydraulic implement lift mechanism in a manner such that it will force the push rod 45 rearwardly or forwardly at the will of the operator.

In using the device, the tractor is placed in position with the saw 35 adjacent the base of a tree to be cut down. The tractor is then secured in position by locking its brakes and the implement lift mechanism is operated to bring the cross bar 47 on the rear end of the pusher rod 45 against the tree at a location above the saw. The upper end of the hand lever 39 is then moved forwardly to feed the saw rearwardly and into the adjacent tree and, as the saw cuts into the tree the control lever 26 of the hydraulic implement lift is operated to cause the implement lift to apply a rearwardly directed pressure to the push rod 45 thereby forcing the tree rearwardly away from the tractor as it is cut off by the saw 35. After the tree has been cut off and felled the drive from the tractor engine to the power take-off connection 29 is discontinued, the upper end of the hand lever 39 is moved rearwardly to retract the saw away from the tree stump and the upper end of the hand lever 37 is moved forwardly to elevate the saw a suitable distance above the ground. The tractor may now be moved to a new location and the tree felling operation repeated.

In order to maintain the cross bar 47 on the rear end of the push bar 45 in a substantially horizontal position the guide tube 41 is provided in its upper side with an elongated slot 115 extending longitudinally of the guide tube intermediate the length thereof and the push rod 45 is provided with an outwardly projecting pin 116 slidably received in the slot 115 and restraining the push rod against rotation relative to the guide tube while providing freedom of longitudinal movement of the push rod through the guide tube.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with an agricultural tractor having a pair of rear driving wheels, a rear axle housing extending between said rear wheels, a platform above said rear axle housing and a power take-off connection adjacent said rear axle housing, a tree saw attachment comprising an elongated main frame pivotally mounted near one end on said rear axle housing for movement about an axis extending transversely of said main frame and disposed substantially parallel to the axis of rotation of the rear driving wheels of the associated tractor, a first shaft journaled on said main frame for rotation about an axis substantially coincident with the axis of the pivotal connection between said main frame and the rear axle housing of the tractor, means drivingly connecting the power take-off connection of the tractor to said first shaft, said main frame extending forwardly and rearwardly of said pivotal connection between said main frame and said rear axle housing, a post secured to said main frame at the rear end of the latter and upstanding therefrom substantially perpendicularly thereto, bearings mounted on said post in spaced apart relationship to each other and having a common axis disposed substantially parallel to the longitudinal center line of said post, a second shaft journaled in said bearings, means drivingly connecting said first shaft to said second shaft, a sub-frame having spaced apart and substantially parallel sides pivotally mounted at one side on said post for swinging movements about the rotational axis of said second shaft, a third shaft journaled on said sub-frame at the other side of the latter and disposed substantially parallel to said second shaft, means drivingly connecting said second shaft to said third shaft, a circular saw mounted on said third shaft at the end of the latter nearest said main frame, a first hand lever mounted on the platform of the associated tractor, link means connecting said first hand lever to said sub-frame for swinging the latter about the pivotal connection between said sub-frame and said post, a second hand lever mounted on the tractor platform, and link means connecting said second hand lever to said main frame at the front end of the latter for moving said main frame about the pivotal connection between said main frame and said tractor rear axle housing for raising and lowering the rear end of said main frame and said saw.

2. In combination with an agricultural tractor having a frame, a rear axle housing, and a power take-off connection, a tree saw attachment comprising a substantially horizontally disposed main frame having a front end and a rear end and pivotally mounted adjacent its front end on said tractor rear axle housing for movement about a substantially horizontally disposed axis extending transversely of said main frame, a support upstanding from said main frame at the rear end thereof, a substantially vertically disposed sub-frame having spaced apart and substantially parallel sides pivotally connected at one side to said support for swinging movements relative to said main frame about a substantially vertical axis, a vertically disposed saw arbor journaled on said sub-frame at the other side of the latter, a circular saw mounted on the lower end of said saw arbor, means carried by said main frame drivingly connecting said tractor power take-off connection to said saw arbor, first manually operated means mounted on said tractor frame and connected to said main frame for raising and lowering the rear end of the latter, and second manually operated means mounted on said tractor frame and connected to said sub-frame for swinging the latter about its pivotal connection with said main frame and imparting feeding or retracting movements to said saw.

3. In combination with an agricultural tractor having a frame, a rear axle housing, and a power take-off connection, a tree saw attachment comprising a substantially horizontally disposed main frame having a front end and a rear end and pivotally mounted adjacent its front end on said tractor rear axle housing for movement about a substantially horizontally disposed axis extending transversely of said main frame, a support upstanding from said main frame at the rear end thereof, a substantially vertically disposed sub-frame having spaced apart and substantially parallel sides pivotally connected at one side to said support for swinging movements relative to said main frame about a substantially vertical axis, a vertically disposed saw arbor journaled on said sub-frame at the other side of the latter, a circular saw mounted on the lower end of said saw arbor, means carried by said main frame drivingly connecting said tractor power take-off connection to said saw arbor, first manually operated means mounted on said tractor frame and connected to said main frame for raising and lowering the rear end of the latter, second manually operated means mounted on said tractor frame and connected to said sub-frame for swinging the latter about its pivotal connection with said main frame and imparting feeding or retracting movements to said saw, and spring means connected between said tractor frame and said main frame counter-balancing the weight at the rear end of said main frame to facilitate vertical movements of the rear end of said main frame by said first manually operated means.

4. In a tree saw attachment adapted to be mounted on an agricultural tractor and including a main frame adapted to be pivotally connected at one end to the rear axle housing of an associated tractor for vertical movements of adjustment, a first shaft journalled on and extending transversely of said main frame near said one end of the latter and adapted to be driven by the power take-off connection of an associated tractor, a vertically disposed post mounted on said main frame at the other end of the latter, bearings mounted on said post at locations spaced apart therealong, a second shaft journalled in said bearings and disposed substantially parallel to said post, means drivingly connecting said first shaft to said second shaft, a sub-frame mounted on said second shaft for swinging movements about the rotational axis of said second shaft, a third shaft journalled on said sub-frame in spaced and substantially parallel relationship to said second shaft and extending below said sub-frame, means drivingly connecting said second shaft to said third shaft, and a circular saw mounted on the lower end of said third shaft.

5. In a tree saw attachment adapted to be mounted on an agricultural tractor and including a main frame adapted to be pivotally connected at one end to the rear axle housing of an associated tractor for vertical movements of adjustment, a first shaft journalled on and extending transversely of said main frame near said one end of the latter and adapted to be driven by the power take-off connection of an associated tractor, a vertically disposed post mounted on said main frame at the other end of the latter, bearings mounted on said post at locations spaced apart therealong, a second shaft journalled in said bearings and disposed substantially parallel to said post, means drivingly connecting said first shaft to said second shaft, a sub-frame mounted on said second shaft for swinging movements about the rotational axis of said second shaft, a third shaft journalled on said sub-frame in spaced and substantially parallel relationship to said second shaft and extending below said sub-frame, means drivingly connecting said second shaft to said third shaft, a circular saw mounted on the lower end of said third shaft, manually operated means connected to said main frame and adapted to be mounted on an associated tractor for adjustably raising and lowering said main frame and said sub frame, and manually operated means connected to said sub frame and adapted to be mounted on an associated tractor for adjustably swinging said sub frame about said second shaft.

6. In a tree saw attachment adapted to be mounted on an agricultural tractor and including a main frame adapted to be pivotally connected at one end to the rear axle housing of an associated tractor for vertical movements of adjustment, a first shaft journalled on and extending transversely of said main frame near said one end of the latter and adapted to be driven by the power take-off connection of an associated tractor, a vertically disposed post mounted on said main frame at the other end of the latter, bearings mounted on said post at locations spaced apart therealong, a second shaft journalled in said bearings and disposed substantially parallel to said post, means drivingly connecting said first shaft to said second shaft, a sub-frame mounted on said second shaft for swinging movements about the rotational axis of said second shaft, a third shaft journalled on said sub-frame in spaced and substantially parallel relationship to said second shaft and extending below said sub-frame, means drivingly connecting said second shaft to said third shaft, a circular saw mounted on the lower end of said third shaft, manually operated means connected to said main frame and adapted to be mounted on an associated tractor for adjustably raising and lowering said main frame and said sub-frame, manually operated means connected to said sub-frame and adapted to be mounted on an associated tractor for adjustably swinging said sub-frame about said second shaft, and spring means connected to said main frame and adapted to be connected to an associated tractor for exerting a lifting force on said main frame.

PHILIP WHITESIDE.

References Cited in the file of this patent

UNITED STATES PATENTS

| Number | Name | Date |
|---|---|---|
| 1,126,312 | Strauss | Jan. 26, 1915 |
| 1,318,324 | Keon | Oct. 7, 1919 |
| 1,830,871 | Domagola | Nov. 10, 1931 |
| 1,832,599 | Wilhelm et al. | Nov. 17, 1931 |
| 2,354,625 | Van Sickle | July 25, 1944 |
| 2,404,655 | Randall | July 23, 1946 |
| 2,439,607 | Irwin | Apr. 13, 1948 |
| 2,461,589 | Crawford | Feb. 15, 1949 |
| 2,462,314 | Fugua | Feb. 22, 1949 |
| 2,542,952 | White | Feb. 20, 1951 |